United States Patent
Xie et al.

(10) Patent No.: US 10,884,122 B2
(45) Date of Patent: Jan. 5, 2021

(54) SYSTEM AND METHOD FOR DETECTING AN OBJECT

(71) Applicant: SZ DJI TECHNOLOGY CO., LTD., Shenzhen (CN)

(72) Inventors: Jiebin Xie, Shenzhen (CN); Wei Ren, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 331 days.

(21) Appl. No.: 15/665,877

(22) Filed: Aug. 1, 2017

(65) Prior Publication Data

US 2017/0356999 A1 Dec. 14, 2017

Related U.S. Application Data (63) Continuation of application No. PCT/CN2015/078445, filed on May 7, 2015.

(51) Int. Cl.
*G01S 15/04* (2006.01)
*G01S 15/06* (2006.01)
(Continued)

(52) U.S. Cl.
CPC ............... *G01S 15/04* (2013.01); *G01S 7/52* (2013.01); *G01S 15/06* (2013.01); *G01S 15/102* (2013.01);
(Continued)

(58) Field of Classification Search
CPC ........ G01S 15/04; G01S 15/102; G01S 15/06; G01S 15/105; G01S 15/93; G01S 15/876; G01S 7/526; G01S 7/52
See application file for complete search history.

(56) References Cited

U.S. PATENT DOCUMENTS

| 4,858,203 A | 8/1989 | Hansen |
| 5,142,649 A * | 8/1992 | O'Donnell .......... G01S 15/8952 367/7 |

(Continued)

FOREIGN PATENT DOCUMENTS

| CN | 1147302 A | 4/1997 |
| CN | 2324549 Y | 6/1999 |

(Continued)

OTHER PUBLICATIONS

The World Intellectual Property Organization (WIPO) International Search Report and Written Opinion for PCT/CN2015/078445, dated Feb. 4, 2016 6 Pages.

(Continued)

*Primary Examiner* — Ian J Lobo
(74) *Attorney, Agent, or Firm* — Anova Law Group, PLLC (57) ABSTRACT

A system for detecting objects using ultrasonic waves and methods for making and using the same are provided. The object detection system uniquely encodes each of a plurality of ultrasonic waves and transmit each of the uniquely-encoded ultrasonic waves in a respective direction. The object detection system then receives any of the emitted uniquely-encoded ultrasonic waves that are reflected from an object. By decoding the reflected ultrasonic waves, the object detection system distinguishes among the uniquely-encoded ultrasonic waves and detect the existence and location of the object.

14 Claims, 7 Drawing Sheets

(51) Int. Cl.
*G01S 15/10* (2006.01)
*G01S 7/52* (2006.01)
*G01S 15/93* (2020.01)
*G01S 7/526* (2006.01)
*G01S 15/87* (2006.01)

(52) U.S. Cl.
CPC ............ *G01S 15/105* (2013.01); *G01S 15/93* (2013.01); *G01S 7/526* (2013.01); *G01S 15/876* (2013.01)

(56) References Cited

U.S. PATENT DOCUMENTS

| | | | |
|---|---|---|---|
| 5,901,234 | A | 5/1999 | Sonohara et al. |
| 8,904,708 | B2* | 12/2014 | Zacchio ................. B66B 13/26 49/25 |
| 2003/0156495 | A1* | 8/2003 | Haase ................... G01S 3/8034 367/119 |
| 2005/0054928 | A1* | 3/2005 | Cerofolini .............. A61B 8/481 600/443 |
| 2008/0229833 | A1* | 9/2008 | Asafusa .............. G01S 7/52047 73/627 |
| 2011/0178707 | A1 | 7/2011 | Sachs et al. |
| 2012/0082004 | A1* | 4/2012 | Boufounos ........... G01S 15/876 367/99 |
| 2014/0245836 | A1 | 9/2014 | Nagae et al. |

FOREIGN PATENT DOCUMENTS

| | | |
|---|---|---|
| CN | 101149433 A | 3/2008 |
| CN | 201154669 Y | 11/2008 |
| CN | 101598793 A | 12/2009 |
| CN | 102413425 A | 4/2012 |
| CN | 103490827 A | 1/2014 |
| CN | 103592618 A | 2/2014 |
| CN | 103988093 A | 8/2014 |
| JP | 52127261 A | 10/1977 |
| JP | 6247264 B2 | 10/1987 |
| JP | 1180483 A | 7/1989 |
| JP | 2772647 B2 | 4/1998 |
| JP | 10212999 A | 8/1998 |
| JP | 20030021613 A | 1/2003 |
| JP | 2003121285 A | 4/2003 |
| JP | 2008139144 A | 6/2008 |

OTHER PUBLICATIONS

Tomoharu Sato et al., Verification of Multi-channelization Using Chirp Signal Modulated with M Sequence Code, The Acoustical Conference of the Japan Acoustical Society Conference Papers Collection, Mar. 10, 2009, 5 pages, vol. 2009.

Shubo Xin, Test of MRS III Miniature Automatic Ranging and Positioning System, Investigation Team of Pearl River Nater Conservancy Commission, Ministry of Water Resources and Electricity, pp. 196-197, Sep. 30, 1984.

Lianxing Zheng et al., Turbine Engine Aircraft Structure and System (AV) vol. 2, pp. 391-392, Nov. 30, 2006.

* cited by examiner

SYSTEM AND METHOD FOR DETECTING AN OBJECT

CROSS-REFERENCE TO RELATED APPLICATION

This is a continuation application of International Application No. PCT/CN2015/078445, filed on May 7, 2015, the entire contents of which are incorporated herein by reference.

FIELD

The disclosed embodiments relate generally to object detection and more particularly, but not exclusively, to collision avoidance systems and methods.

BACKGROUND

Ultrasound is commonly used in object detection systems because of its high accuracy. Exemplary obstacle detecting applications include automobile backing radar and collision avoidance systems for Unmanned Aerial Vehicles ("UAVs").

In case of collision avoidance systems for UAVs, for example, multiple ultrasonic sensors typically are utilized for detecting obstacles in respective directions. The multiple ultrasonic sensors usually work independently. For example, an ultrasonic sensor in one direction emits an ultrasonic wave pulse. The ultrasonic wave pulse is reflected back by an object in the path of the ultrasonic wave and, after certain time elapses, received by an ultrasonic sensor. A calculation module can decide an existence and a distance of the object based on the time interval between the reception time of the pulse and the emitting time of the pulse.

However, interference among those sensors can occur. When a UAV is deployed in a small operating environment, an ultrasonic signal emitted from a first ultrasonic sensor in one direction can be reflected multiple times and received by a second ultrasonic sensor, resulting in erroneous determination. Although various techniques, such as use of preselected signal threshold limits, have been attempted for overcoming the errors resulting from unwanted reflections, none have proven to be sufficient.

In view of the foregoing reasons, there is a need for systems and methods for performing object detection that can effectively distinguish directly reflected ultrasonic wave signals applied in multiple directions.

SUMMARY

In accordance with a first aspect disclosed herein, there is set forth a method for detecting an object, comprising:

receiving a plurality of reflected ultrasonic waves each being uniquely encoded and emitted in a respective direction from a signal source; and decoding the reflected ultrasonic wave to determine an existence or location of the object.

Exemplary embodiments of the disclosed methods further comprise emitting a uniquely encoded ultrasonic wave in a respective direction.

In another exemplary embodiment of the disclosed methods, emitting the uniquely encoded ultrasonic waves comprises emitting a unique pattern of ultrasonic pulses.

In another exemplary embodiment of the disclosed methods, emitting the unique pattern comprises emitting the ultrasonic pulses in a unique interval.

In another exemplary embodiment of the disclosed methods, emitting the ultrasonic pulses in a unique interval comprises emitting ultrasonic pulses in an interval value selected from a range of one millisecond to one hundred milliseconds.

Exemplary embodiments of the disclosed methods further comprise recording the plurality of reflected ultrasonic waves.

In another exemplary embodiment of the disclosed methods, decoding the reflected ultrasonic wave further comprises searching for the unique pattern of ultrasonic pulses from the plurality of reflected ultrasonic waves.

In another exemplary embodiment of the disclosed methods, searching for the unique pattern of ultrasonic pulses comprises searching for ultrasonic pulses that match the unique interval of the emitted ultrasonic pulses.

In another exemplary embodiment of the disclosed methods, searching for the ultrasonic pulses comprises selecting a pattern of ultrasonic pulses matching the unique interval when there is only one pattern of ultrasonic pulses matching the unique interval from the reflected ultrasonic waves and a strength difference of the ultrasonic pulses in the pattern is less than a first threshold.

In another exemplary embodiment of the disclosed methods, matching the unique interval comprises determining the pattern matches the unique interval when a difference between the interval of the pattern and the unique interval is less than a second threshold.

In another exemplary embodiment of the disclosed methods, searching for the ultrasonic pulses comprises selecting the ultrasonic pulses with the strength difference less than the first threshold.

In another exemplary embodiment of the disclosed methods, decoding the reflected ultrasonic wave comprises selecting, from the plurality of reflected ultrasonic waves, a first pattern of ultrasonic pulses matching the unique interval when there are two or more patterns of ultrasonic pulses that match the unique interval and a difference of average pulse strengths of the patterns is less than a third threshold.

In another exemplary embodiment of the disclosed methods, decoding encoded ultrasonic waves comprises selecting, from the recorded reflected ultrasonic waves, a strongest pattern of ultrasonic pulses matching the unique interval when there are two or more patterns of ultrasonic pulses that match the unique interval and a difference of average pulse strengths of the patterns is greater than a third threshold.

Exemplary embodiments of the disclosed methods further comprise determining the difference of average pulse strengths by calculating a difference value over a plurality of average pattern strengths, wherein each averaged pattern strength is provided by averaging strengths of all pulses in the pattern.

In accordance with another aspect disclosed herein, there is set forth a method for detecting objects in predetermined directions, comprising:

detecting an object in each of the predetermined directions in accordance with any one of previous embodiments of the disclosed methods.

In another exemplary embodiment of the disclosed methods, the predetermined directions comprise four directions.

In another exemplary embodiment of the disclosed methods, the four directions comprise forward direction, a back direction, and two side directions.

In accordance with another aspect disclosed herein, there is set forth a computer program product comprising instructions for detecting objects in predetermined directions configured to perform a detection process in accordance with any one of previous embodiments of the disclosed methods.

In accordance with another aspect disclosed herein, there is set forth an ultrasonic device for detecting an object, comprising:

a receiving sensor for receiving a plurality of reflected ultrasonic waves each being uniquely encoded and emitted in a respective direction from a signal source; and, a processor for decoding the reflected ultrasonic waves to determine an existence or location of the object.

Exemplary embodiments of the disclosed devices further comprise an emitting sensor for emitting a uniquely encoded ultrasonic wave in the respective direction.

In an exemplary embodiment of the disclosed devices, the uniquely encoded ultrasonic waves are emitted in a unique pattern of ultrasonic pulses.

In an exemplary embodiment of the disclosed devices, the unique pattern comprises ultrasonic pulses in a unique interval.

In an exemplary embodiment of the disclosed devices, the unique interval is selected from a range of one millisecond to one hundred milliseconds.

Exemplary embodiments of the disclosed devices further comprise a recorder for recording the plurality of reflected ultrasonic waves.

In an exemplary embodiment of the disclosed devices, the processor is configured to search for the unique pattern of ultrasonic pulses from the plurality of reflected ultrasonic waves.

In an exemplary embodiment of the disclosed devices, the processor is configured to search for ultrasonic pulses that match the unique interval of the emitted ultrasonic pulses.

In an exemplary embodiment of the disclosed devices, the processor is configured to select a pattern of ultrasonic pulses matching the unique interval when there is only one pattern of ultrasonic pulses matching the unique interval from the reflected ultrasonic waves and a strength difference of the ultrasonic pulses in the pattern is less than a first threshold.

In an exemplary embodiment of the disclosed devices, the pattern matches the unique interval when a difference between the interval of the pattern and the unique interval is less than a second threshold.

In an exemplary embodiment of the disclosed devices, the processor is configured to select the ultrasonic pulses with the strength difference less than the first threshold.

In an exemplary embodiment of the disclosed devices, the processor is configured to select, from the plurality of reflected ultrasonic waves, a first pattern of ultrasonic pulses matching the unique interval when there are two or more patterns of ultrasonic pulses that match the unique interval and a difference of average pulse strengths of the patterns is less than a third threshold.

In an exemplary embodiment of the disclosed devices, the processor is configured to select, from the recorded reflected ultrasonic waves, a strongest pattern of ultrasonic pulses matching the unique interval when there are two or more patterns of ultrasonic pulses that match the unique interval and a difference of average pulse strengths of the patterns is greater than a third threshold.

In an exemplary embodiment of the disclosed devices, the difference of average pulse strengths is determined by calculating a difference value over a plurality of average pattern strengths, wherein each averaged pattern strength is provided by averaging strengths of all pulses in the pattern.

In accordance with another aspect disclosed herein, there is set forth a system for detecting objects in predetermined directions, comprising:

a plurality of ultrasonic devices for the predetermined directions with each ultrasonic device being provided in accordance with any one of previous embodiments of the disclosed devices.

In another exemplary embodiment of the disclosed systems, the predetermined directions comprise four directions.

In another exemplary embodiment of the disclosed systems, the four directions comprise forward direction, a back direction, and two side directions.

Exemplary embodiments of the disclosed systems further comprise a memory for storing the reflected ultrasonic waves.

In another exemplary embodiment of the disclosed systems, the processors of the respective ultrasonic devices are at least partially integrated to form a centralized processor.

In accordance with another aspect disclosed herein, there is set forth a mobile platform, comprising:

a system provided in accordance with any one of previous embodiments of the disclosed devices.

In an exemplary embodiment of the disclosed mobile platform, the mobile platform is an UAV or an automobile.

In accordance with another aspect disclosed herein, there is set forth an object detection system, comprising:

a plurality of emitting sensors each for emitting uniquely encoded ultrasonic waves;

a plurality of receiving sensors each corresponding with a respective emitting sensor for receiving reflected ultrasonic waves; and a processor for decoding a received ultrasonic wave to identify a source and a reflection manner of the received ultrasonic wave.

In an exemplary embodiment of the disclosed systems, the uniquely encoded ultrasonic waves are emitted in a unique pattern of ultrasonic pulses.

In an exemplary embodiment of the disclosed systems, the unique pattern comprises ultrasonic pulses in a unique interval.

In another exemplary embodiment of the disclosed systems, the unique interval is selected from a range of one millisecond to one hundred milliseconds.

Exemplary embodiments of the disclosed systems further comprise a recorder for recording the plurality of reflected ultrasonic waves.

In another exemplary embodiment of the disclosed systems, the processor is configured to search for the unique pattern of ultrasonic pulses for each receiving sensor from the plurality of reflected ultrasonic waves.

In another exemplary embodiment of the disclosed systems, the processor is configured to search for ultrasonic pulses that match the unique interval of the ultrasonic pulses emitted from each corresponding emitting sensors.

In another exemplary embodiment of the disclosed systems, the processor is configured to select a pattern of ultrasonic pulses matching the unique interval when there is only one pattern of ultrasonic pulses matching the unique interval from the reflected ultrasonic waves and a strength difference of the ultrasonic pulses in the pattern is less than a first threshold.

In another exemplary embodiment of the disclosed systems, the pattern matches the unique interval when a difference between the interval of the pattern and the unique interval is less than a second threshold.

In another exemplary embodiment of the disclosed systems, the processor is configured to select the ultrasonic pulses with the strength difference less than the first threshold.

In another exemplary embodiment of the disclosed systems, the processor is configured to select, from the plurality of reflected ultrasonic waves, a first pattern of ultrasonic pulses matching the unique interval when there are two or more patterns of ultrasonic pulses that match the unique interval and a difference of average pulse strengths of the patterns is less than a third threshold.

In another exemplary embodiment of the disclosed systems, the processor is configured to select, from the recorded reflected ultrasonic waves, a strongest pattern of ultrasonic pulses matching the unique interval when there are two or more patterns of ultrasonic pulses that match the unique interval and a difference of average pulse strengths of the patterns is greater than a third threshold.

In another exemplary embodiment of the disclosed systems, the difference of average pulse strengths is determined by calculating a difference value over a plurality of average pattern strengths, wherein each averaged pattern strength is provided by averaging strengths of all pulses in the pattern.

In accordance with another aspect disclosed herein, there is set forth a mobile platform, comprising a system provided in accordance with any one of previous embodiments of the disclosed systems.

In another exemplary embodiment of the mobile platform, the mobile platform is an UAV or an automobile.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION

Since currently-available object detection systems can achieve erroneous results due to unwanted reflections and interference among multiple ultrasonic sensors, an ultrasonic detection system and method that can avoid errors resulting from the unwanted reflections and the multiple ultrasonic sensors can prove desirable and provide a basis for wide range of system application, such as UAV systems and other mobile systems. This result can be achieved, according to one embodiment disclosed in FIG. 1.

Figure 1:
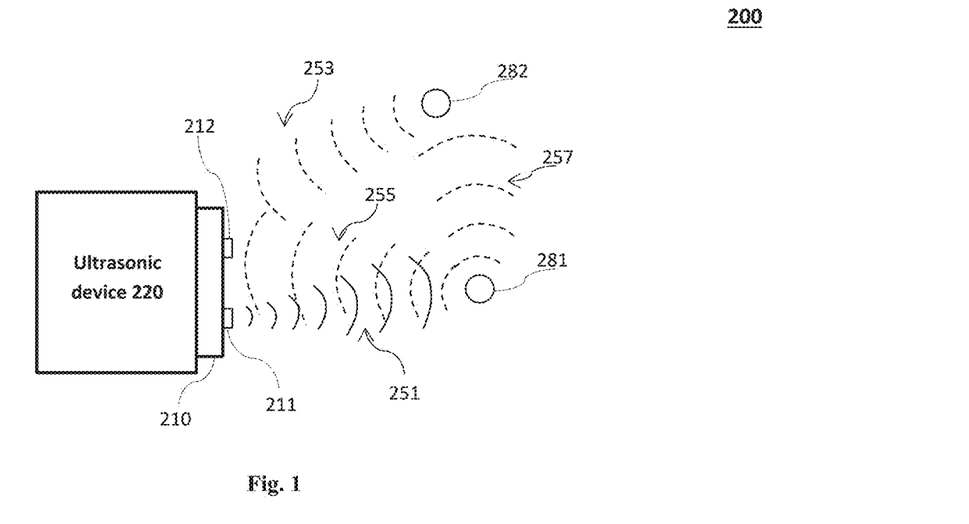
FIG. 1 is an exemplary schematic diagram, illustrating an embodiment of an ultrasonic device for detecting an object.

FIG. 1 shows an exemplary embodiment of a system 200 for detecting a first object 281 using an ultrasonic wave 251. The system 200 can comprise an ultrasonic device 220 that comprises one ultrasonic module 210 including an emitting sensor 211 for emitting ultrasonic wave 251 and a receiving sensor 212 for receiving reflected ultrasonic wave 255. The emitted ultrasonic wave 251 can travel until being reflected by the first object 281 in a path of the ultrasonic wave 251. After a first elapsed time, the reflected ultrasonic waves 255, which can be directly reflected by the first object 281, can be received by the receiving sensor 212. The ultrasonic device 220 then can determine a distance to the first object 281 based on the first elapsed time. Although shown and described as having one ultrasonic device 220 with one ultrasonic module 210 for purposes of illustration only, the ultrasonic device 220 can include multiple ultrasonic modules 210 for detecting objects in respective directions. Alternative embodiments of the ultrasonic device 220 will be shown and described with reference to FIG. 4.

In FIG. 1, an unwanted ultrasonic wave 253 can also be received by the receiving sensor 212 in real operation environments. The unwanted ultrasonic wave 253 can comprise an ultrasonic wave emitted from another emitting sensor 211 (not shown) or can be the ultrasonic wave 251 reflected by at least one more object, such as a second object 282, before being received by the receiving sensor 212. In FIG. 1, the ultrasonic wave 251 is transmitted to the first object 281 and reflected towards the second object 282 as an ultrasonic wave 257. The ultrasonic wave 257 can be reflected again and become the unwanted ultrasonic wave 253 that can be received by the receiving sensor 212. In any of the above described cases, the unwanted ultrasonic wave 253 can cause erroneous calculation results in determining an existence of and the distance to the first object 281 or the second object 282.

In the system 200, for purposes of determining the existence of the first object 281, the emitted ultrasonic wave 251 can be encoded to enable the directly reflected ultrasonic wave 255 to be distinguished from the unwanted ultrasonic wave 253. When received by the receiving sensor 212, the reflected ultrasonic wave 255 can be decoded to determine whether the reflected ultrasonic wave 255 is the ultrasonic wave 251 originally being emitted from the emitting sensor 211 and reflected directly from the first object 281. Additional detail regarding the encoded ultrasonic wave 251 and decoding the reflected ultrasonic wave 255 will be provided below with reference to FIGS. 2 to 9.

Figure 2:
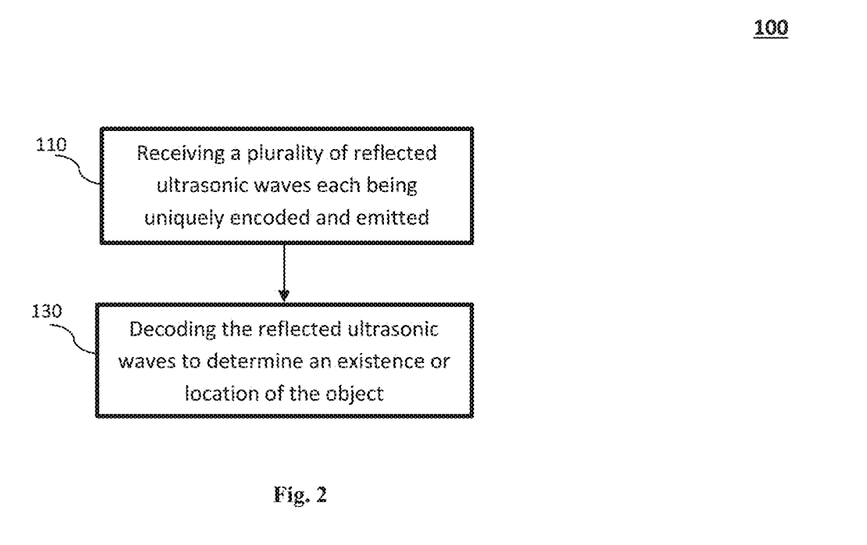
FIG. 2 is an exemplary top level flowchart, illustrating an embodiment of a method for distinguishing ultrasonic waves emitted from different sensors using the ultrasonic device of FIG. 1.

FIG. 2 illustrates an exemplary embodiment of a method 100 for detecting an object, such as the first object 281 (shown in FIG. 1), using ultrasonic device 220 of FIG. 1. To detect the object, a plurality of ultrasonic waves can be received, at 110, with each ultrasonic wave being uniquely encoded and emitted in a respective direction from a signal source. Encoding of the ultrasonic waves are shown and described below in additional detail with reference to FIG. 5. In some embodiments, the encoded ultrasonic waves can be transmitted in respective directions relative to a mobile platform (not shown) for detecting an existence of the object and a location of (or distance to) the object.

As shown and described with reference to FIG. 1, the reflected ultrasonic waves that can be received by a ultrasonic receiver, such as the receiving sensor 212 (shown in FIG. 1) can include the ultrasonic wave 251 and the unwanted ultrasonic wave 253 (collectively shown in FIG. 1). When received at 110, the reflected ultrasonic waves can be decoded, at 130, to determine the existence and/or location of the object. Generally, a decoding scheme being used can be a reverse of the scheme used for encoding the ultrasonic wave 251 when being emitted from the signal source. In the exemplary embodiment, the decoding can be conducted according to properties of the emitted ultrasonic wave 251, including an interval of the ultrasonic pulses of the ultrasonic wave 251, which ultrasonic pulses can be emitted in patterns. Exemplary embodiments for the encoding will be shown and described below with reference to FIG. 7.

Although shown and described as being a reverse of the scheme used for encoding for purposes of illustration only, any decoding scheme suitable for deciding the signal source of the reflected ultrasonic waves can be used for the decoding when the encoded ultrasonic waves are received.

Figure 3:
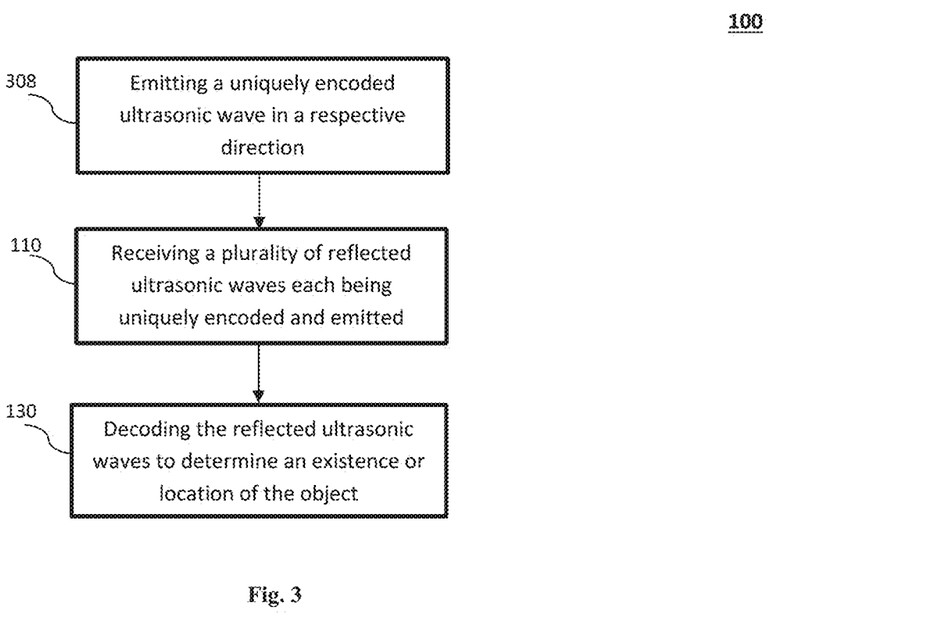
FIG. 3 is an exemplary top level flowchart, illustrating an alternative embodiment of the method of FIG. 2, wherein ultrasonic waves are emitted in respective directions.

FIG. 3 shows another exemplary embodiment of the method 100 for detecting an object. In FIG. 3, a uniquely encoded ultrasonic wave for each respective direction is emitted, at 308. To detect the object, as shown and described with reference to FIG. 1, at least one ultrasonic wave can be emitted in a predetermined direction. In some embodiments, one ultrasonic wave can be transmitted in each of a plurality of respective directions. As shown and described with reference with FIG. 2, the emitted and reflected ultrasonic waves are encoded in order to identify a signal source. At 308, the ultrasonic wave, such as the emitted ultrasonic wave 251 (shown in FIG. 1) is uniquely encoded to present identification for the ultrasonic wave.

The ultrasonic wave 251 can be emitted in any of a variety of different encoding schemes. In an exemplary embodiment, the encoding can be conducted by sending different patterns of ultrasonic waves with each pattern comprising ultrasonic pulses transmitted in a unique interval for identification. Additional detail for encoding the ultrasonic waves will be shown and described below with reference to FIG. 5. The emitted ultrasonic wave travel radially outwards and can be reflected when the object, for example by a wall of a room, is encountered. The ultrasonic wave encoded at 308, when reflected by the object, can be received, at 110, as shown and described with reference to FIG. 2. In order to decide the existence and location of the object, the signal source that sends the ultrasonic wave can be identified by decoding the reflected ultrasonic wave, at 130. Additional details regarding decoding are provided below with reference to FIG. 7.

Although shown and described as being encoding ultrasonic waves in respective directions with emitting ultrasonic pules with unique intervals for purposes of illustration only, other approaches of encoding ultrasonic waves can be utilized as long as the emitted ultrasonic wave can be identified by decoding reflected ultrasonic waves.

Figure 4:
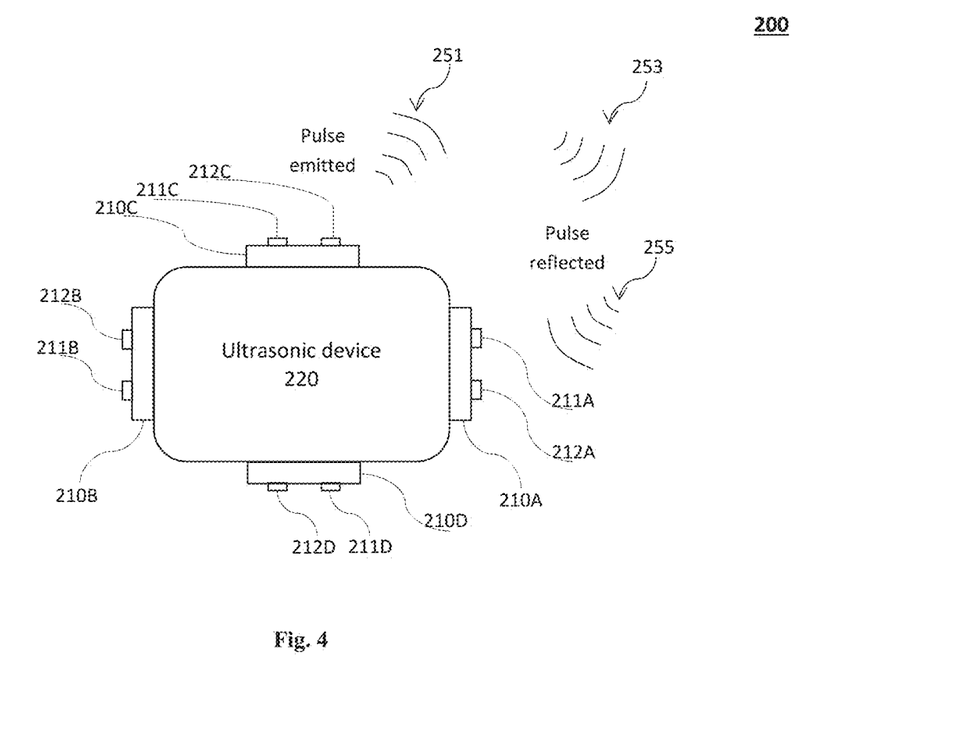
FIG. 4 is an exemplary schematic diagram, illustrating an embodiment of an ultrasonic device for implementing the method of FIG. 2, wherein the ultrasonic device has four ultrasonic modules for four respective directions.

FIG. 4 shows another embodiment of the ultrasonic device 220 that can be used for implementing the method 100 of FIG. 2. The ultrasonic device 220, for example, can be used for purposes of collision avoidance. In FIG. 4, the ultrasonic device 220 can comprise a plurality of ultrasonic modules 210, which include ultrasonic sensors 211, 212. As illustrated in FIG. 4, four ultrasonic modules 210 can be provided. Each of the four ultrasonic modules, 210A, 210B, 210C, 210D, can comprise an emitting sensor 211, such as a first emitting sensor 211A, and a receiving sensor 212, such as a first receiving sensor 212A. In the exemplary embodiment shown in FIG. 4, the ultrasonic device 220 can include the first emitting sensor 211A and the first receiving sensor 212A of the first ultrasonic module 210A, the second emitting sensor 211B and the second receiving sensor 212B of the second ultrasonic module 210B, the third emitting sensor 211C and the third receiving sensor 212C of the third ultrasonic module 210C, and the fourth emitting sensor 211D and the fourth receiving sensor 212D of the fourth ultrasonic module 210D.

In FIG. 4, any of the ultrasonic modules 210 can be integrated with the ultrasonic device 220, as shown in FIG. 4. The ultrasonic device 220 can also be arranged in any suitable location of a mobile platform (not shown) which needs detection of surroundings. However, any of the ultrasonic modules 210 can also be arranged separately in any suitable position of the mobile platform, for example, each of four sides of the mobile platform or each of four corners of the mobile platform. Exemplary embodiments regarding the arrangements of the ultrasonic modules 210 with each of two different mobile platforms will be shown and described below with reference to FIGS. 10 and 11.

Although shown and described as comprising four ultrasonic modules 210 for purposes of illustration only, the ultrasonic device 220 can include any suitable number of ultrasonic modules 210 for detecting objects in multiple directions.

The ultrasonic device 220 can comprise any commercially available ultrasonic sensors. The ultrasonic device 220 can also comprise any custom-designed sensors specifically produced for the ultrasonic device 220. The ultrasonic device 220 can comprise any other components necessary, such as an ultrasonic transducer (not shown) for transforming received ultrasonic waves into electrical signals.

Although shown and described as being the ultrasonic device 220 and the ultrasonic sensors 211, 212 for purposes of illustration only, any other proximity sensors by sending and receiving any suitable forms of waves can be used in some embodiment of the disclosure, including but not limited to, sound wave sensors.

Figure 5:
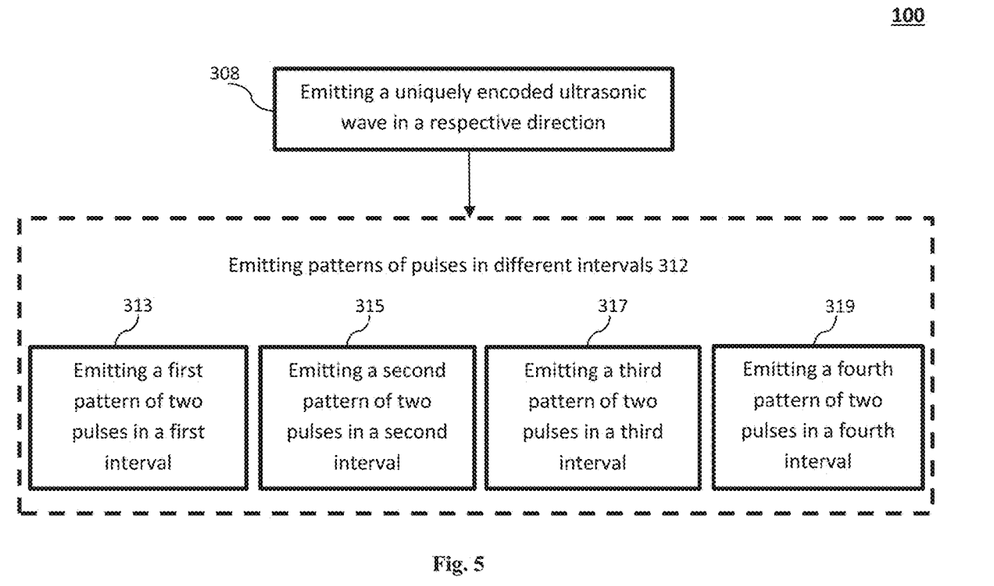
FIG. 5 is an exemplary flow chart illustrating an alternative embodiment of the method of FIG. 3, wherein the method includes emitting four patterns of ultrasonic waves, each having a unique interval.

In FIG. 5, the exemplary embodiment of the encoding procedure 308 of the method 100 can comprise four patterns of ultrasonic pulses, for four directions, each having two ultrasonic pulses with a unique interval. In the exemplary embodiment in FIG. 5, the method 100 can emit a first pattern of two pulses with a first interval, at 313. To ensure continuous detection of the object, the first pattern can be emitted one after another. A time interval between two adjacent patterns can be at least five times of the interval between the two ultrasonic pulses in the first pattern.

Similar to the first pattern, a second pattern of two pulses with a second interval, at 315, a third pattern of two pulses with a third interval, at 317, and a fourth pattern of two pulses with a fourth interval, at 319. Each of the four patterns can be encoded in the manner shown and described with reference to FIG. 3. As an exemplary example, the first interval can be one milliseconds (1 ms), the second interval can be two milliseconds (2 ms), the third interval can be three milliseconds (3 ms), and the fourth interval can be four milliseconds (4 ms). The time interval between adjacent patterns can be at least five milliseconds (5 ms) for all four patterns, and, in some embodiments, be at least ten milliseconds (10 ms). Other intervals can also be used in encoding the ultrasonic waves as long as each signal source of the reflected ultrasonic waves can be identified in the decoding procedure 130 (shown in FIG. 2).

In the exemplary embodiment, in FIG. 5, the four patterns of ultrasonic pulses can be emitted to four respective directions of a mobile platform 1000, such as an Unmanned Aerial Vehicle ("UAV") 900 (shown in FIG. 12) or an automobile 1100 (shown in FIG. 13), to which the ultrasonic device 220 is attached. Among the four patterns of ultrasonic pulses, the first pattern of two ultrasonic pulses can be emitted in a forward direction of the mobile platform. Similarly, the second pattern of two ultrasonic pulses can be emitted in a backward direction of the mobile platform, the third pattern of two ultrasonic pulses can be emitted in one side direction of the mobile platform and the fourth pattern of two ultrasonic pulses can be emitted in another side direction of the mobile platform. The four patterns of ultrasonic pulses can also be emitted from each corner of the mobile platform, such as the automobile 1100, shown and described below with reference to FIG. 13.

Although shown and described as encoding by the patterns of ultrasonic pulses in respective directions with unique intervals for purposes of illustration only, other approaches of encoding ultrasonic waves can be utilized to distinguish among ultrasonic waves emitted to the respective directions. In addition, although shown and described as emitting four patterns of pulses to four respective directions for purposes of illustration only, any suitable number of patterns of ultrasonic pulses can be emitted to multiple directions.

Figure 6:
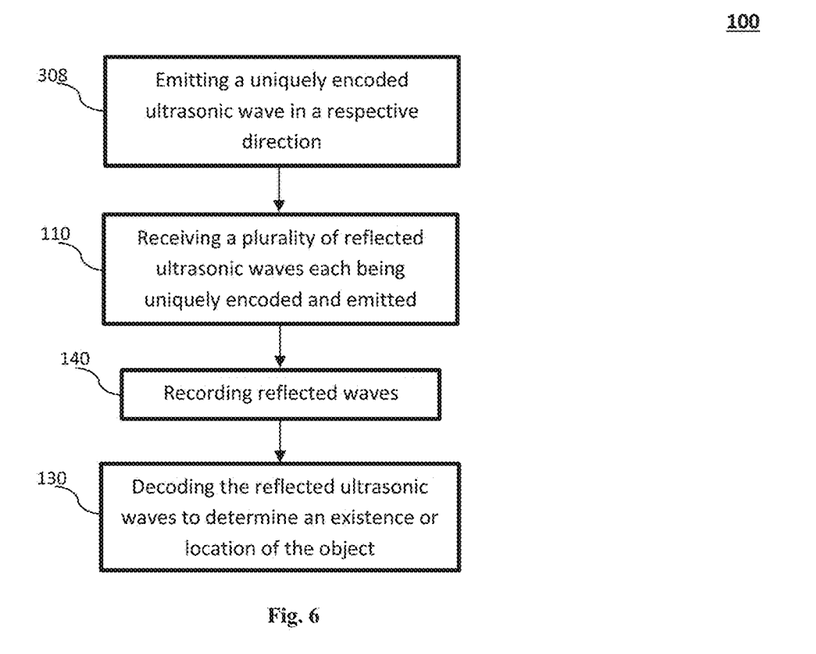
FIG. 6 is an exemplary flow chart illustrating another alternative embodiment of the method of FIG. 3, wherein the method includes recording reflected ultrasonic wave pulses.

Referring now to FIG. 6, in an alternative embodiment, the method 100 can also comprise a procedure for recording reflected ultrasonic waves, at 140. As shown and described above with reference to FIGS. 1 to 4, the ultrasonic waves can be encoded before being emitted from each emitting sensor 211 respectively, at 308. The encoded ultrasonic waves emitted in each direction travel radially outwardly in a path until they encounter one or more objects. The ultrasonic waves can be reflected upon encountering an object, and/or can travel to a next object and so on. When the reflected ultrasonic waves encounter a receiving sensor 212, the receiving sensor 212 can receive the reflected ultrasonic waves that can be reflected by one or more objects. As shown and described with reference to FIG. 1 and FIG. 4, the ultrasonic waves having been reflected two or more times can lead to erroneous calculation results if used in calculation of a existence of the object. In a complex scenario, the ultrasonic waves reflected can be a mixture of a directly reflected ultrasonic wave, such as the ultrasonic wave 251 (shown in FIG. 1) and multiple reflected ultrasonic waves. Exemplary ultrasonic waves received by the receiving sensor 212 are shown and described with reference to FIGS. 6 and 7.

In addition, as shown and described with reference to FIGS. 1-4, other unwanted ultrasonic waves can also include ultrasonic waves emitted from other signal sources. In order to identify the directly reflected ultrasonic wave, all received ultrasonic pulses in the ultrasonic wave can be analyzed for decoding at 130. In some embodiments, such complex ultrasonic waves can be decoded in a real-time manner, i.e. no information storage is necessary. However, in other embodiments, for purposes of analyzing all received ultrasonic pulses, the reflected ultrasonic waves can be recorded, at 140, either temporarily or permanently. The recorded ultrasonic wave signals can be analog or digital. For recording purposes, the ultrasonic wave signals can be transformed into electrical signals with one or more ultrasonic transducers (now shown).

As shown and described with reference to FIG. 2, the recorded ultrasonic waves can be used for decoding, at 130, to determine the directly reflected ultrasonic wave emitted from the signal source. Alternative embodiment regarding the decoding procedure will be shown and described below with reference to FIG. 7.

Although shown and described as being transformed into electrical signals for recording for purposes of illustration only, the ultrasonic waves can be transformed into and stored in any suitable forms of signals, such as magnetic signals etc.

Figure 7:
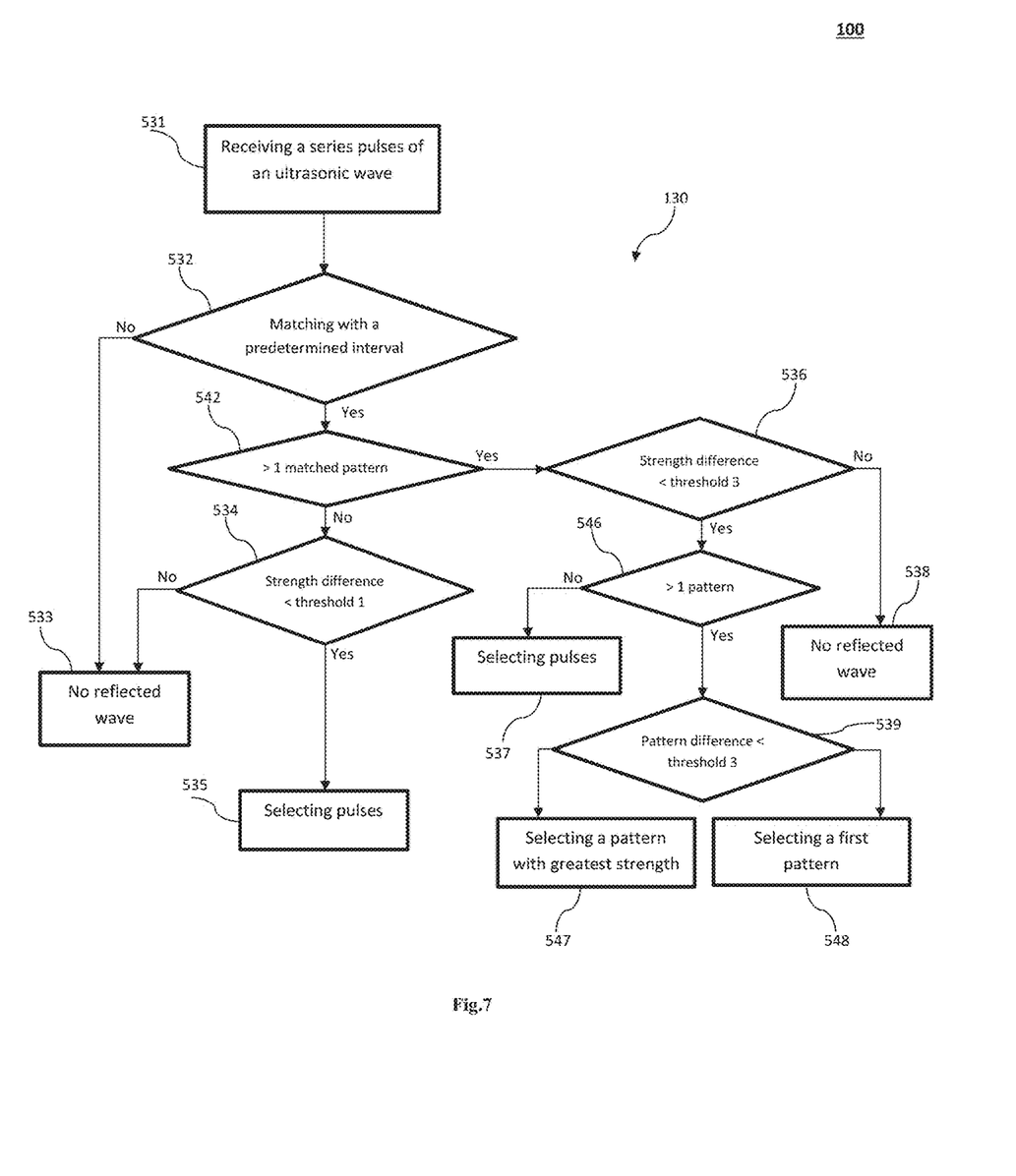
FIG. 7 is an exemplary flow chart illustrating an embodiment of the decoding procedure of the method of FIG. 3.

FIG. 7 shows an exemplary embodiment of decoding reflected ultrasonic waves. Referring now to FIG. 7, when a series of ultrasonic pulses in a mixture of ultrasonic waves are received, a determination can be made, at 130. The determination can include selecting which of the received ultrasonic waves can be used to calculate the existence and location of an object. As shown and described with reference to FIGS. 2 and 3, for purposes of decoding the received ultrasonic waves and achieving accurate detection results, directly reflected ultrasonic wave can be selected. As shown and described with reference to FIG. 6, decoding the ultrasonic waves can comprise selecting received ultrasonic pulses which meet two conditions: first, the selected ultrasonic pulses are emitted from a corresponding emitting sensor; second, the selected ultrasonic pulses are reflected in a reflection manner that the emitted ultrasonic pulses are reflected by only one object.

For purposes of selecting ultrasonic wave, when an ultrasonic wave is received, at 531, and/or recorded, at 140, the ultrasonic wave can be analyzed, or compared, at 532. The analyses include matching the intervals of the received ultrasonic pulses within the ultrasonic wave with a predetermined interval of the ultrasonic pulses emitted from a signal source. In a scenario, when there is no such match, no reflected ultrasonic pulse can be selected, at 533, meaning no object is detected by the ultrasonic device 220 (shown in FIG. 4). In another scenario, when there is one pattern of ultrasonic pulses that match the predetermined interval, at 542, a strength difference of the ultrasonic pulses is determined, at 534. When the difference is less than a first threshold, this pattern can be selected, at 535, as the emitted pattern of ultrasonic pulses that is directly reflected. In this case, the selected pattern of pulses can be used in calculating a distance to the object that reflects the ultrasonic pulses. In the same scenario, when the strength difference of the pattern of pulses is decided, at 534, to be equal or greater than the first threshold, no reflected ultrasonic pulse can be selected, at 533, indicating no object is detected.

In some exemplary embodiments, the first threshold can be a percentage value between zero percent (0%) and twenty percent (20%). In some embodiments, the first threshold can be a percentage value between five percent (5%) to ten percent (10%). In the exemplary embodiments, matching the interval of pulses with the predetermined interval can be decided when a percentage difference of the two intervals is less than a second threshold (not shown). The second threshold can be a percentage value between zero percent (0%) and ten percent (10%). In some embodiments, the second threshold can be a percentage value between zero percent (0%) and two percent (2%).

In another scenario, when there are two or more patterns of pulses, at 542, received by an ultrasonic receiving sensor, which pulses match the predetermined interval, the strength difference of the pulses in each of the patterns can be compared, at 536. In a case there is only one pattern of pulses, at 546, having a strength difference less than the first threshold, this one pattern of ultrasonic pulses can be selected, at 537.

In a case there are two or more matching patterns of pulses are determined to have the strength differences less than the first threshold, at 546, further determination can be made, at 539. A pattern of ultrasonic pulses with greatest average strength can be selected, at 547, when a difference between the average strength of the pattern and any other average strength of the other patterns is equal or greater than a third threshold. However, if the difference between the average strength of the pattern and any other average strength of the other patterns is less than the third threshold, the first pattern of pulses can be selected, at 548, among the patterns of pulses with the greatest average strength and one or more patterns of pulses having the strength difference less than the third threshold.

In some exemplary embodiments, the third threshold can be a percentage value selected between zero percent (0%) to twenty percent (20%). In some embodiments, the third threshold can be a percentage value between five percent (5%) and ten percent (10%).

In another case, when there is no matching pattern of pulses having a strength difference less than the first threshold, at 536, no pattern of pulses can be selected, at 538, indicating there is no object detected in the direction in which the emitting sensor emits the ultrasonic waves.

Figure 8:
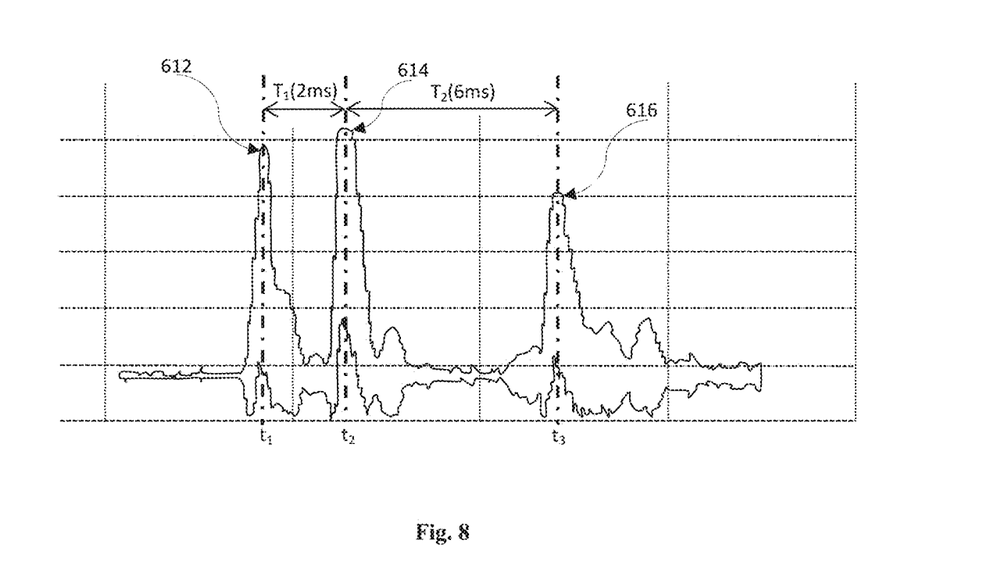
FIG. 8 is an exemplary diagram of an ultrasonic wave received by an ultrasonic sensor of the ultrasonic device of FIG. 4, wherein the first two pulses match an interval of a pattern of emitted pulses.

FIG. 8 shows a scenario of an ultrasonic wave received by an ultrasonic sensor of the ultrasonic device 220 of FIG. 4. In FIG. 8, the ultrasonic wave has three ultrasonic pulses: a first pulse 612, a second pulse 614 and a third pulse 616 are received at instants $t_1$, $t_2$ and $t_3$ respectively. Suppose a pattern of ultrasonic pulses with a predetermined interval T (not shown), such as two milliseconds (2 ms), is being emitted and so being expected. In FIG. 8, a pulse interval between the first instant $t_1$ and the second instant $t_2$ can be represented as a first pulse interval $T_1$ that is also two milliseconds. An interval between the second instant $t_2$ and the third instant $t_3$ can be represented as a second pulse interval $T_2$ that is six milliseconds. In FIG. 8, the first interval $T_1$ matches the predetermined interval T, at 532, as shown and described with reference to FIG. 7. In this case, the pattern of pulses 612, 614 can be selected, at 535, when the difference of strengths of the first pulse 612 and the second pulse 614 is determined to be less than the first threshold, at 534 (shown in FIG. 7).

The third pulse 616 can be decided as not part of the expected pattern of pulses because the second interval $T_2$ between the second pulse 614 and the third pulse 616 is greater than the predetermined interval T by the first threshold, and no other pulse can pair with the third pulse 616 to match the predetermined interval T.

Although shown and described as being two pulses within a pattern for purposes of illustration only, any suitable number of pulses in a pattern can be used in the disclosed method 100.

Figure 9:
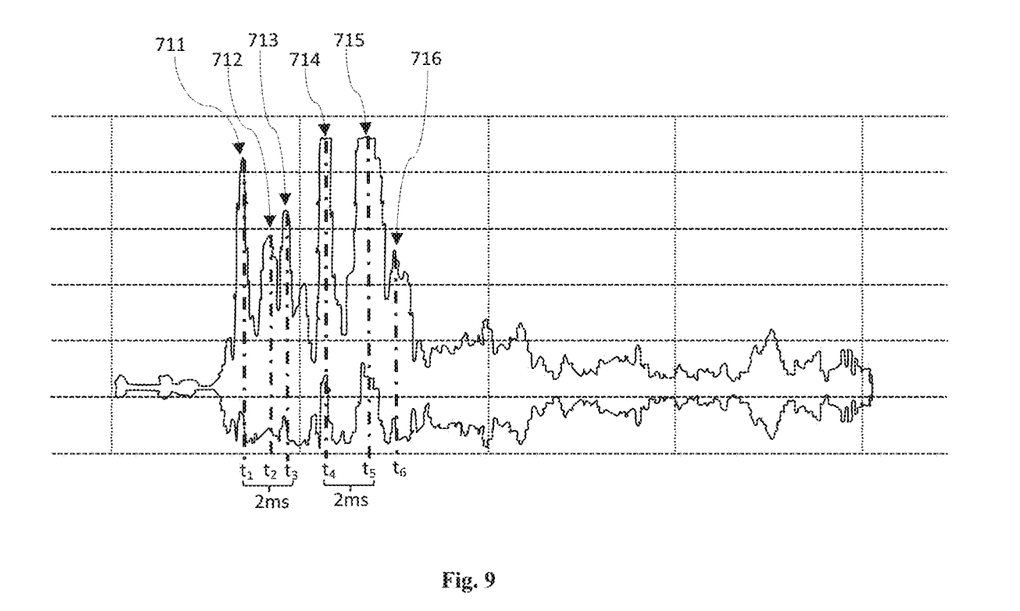
FIG. 9 is an exemplary diagram of an ultrasonic wave received by an ultrasonic sensor of the ultrasonic device of FIG. 4, wherein the multiple patterns of pulses match the interval of the pattern of emitted pulses.

FIG. 9 illustrates a diagram of the ultrasonic wave received by an ultrasonic sensor of the ultrasonic device 220 of FIG. 4. In FIG. 9, there are six ultrasonic wave pulses 711, 712, 713, 714, 715, 716 received at instants $t_1$ to $t_6$ respectively. Suppose that the predetermined interval for emitted ultrasonic pulses is still two milliseconds (2 ms). In FIG. 9, among the six received pulses, each of the intervals between the first and third pulses 711, 713, at $t_1$, $t_3$, and between the fourth and fifth pulses 714, 715, at $t_4$, $t_5$, can match with the predetermined interval T. No other interval between other ultrasonic wave pulses can match with the predetermined interval T.

As shown and described with reference to FIG. 7, in one scenario, the fourth and fifth pulses 714, 715 can be selected when the strength difference of the fourth and fifth pulses 714, 715 is less than the first threshold and the strength difference of the first and third pulses 711, 713 is equal or greater than the first threshold. In another scenario, when the strength difference of the first and third pulses 711, 713 is also less than the first threshold, the pulses 711, 713 can be selected if a difference between the average strength of the first and third pulses 711, 713 and the average strength of the fourth and fifth pulses 714, 715 is less than the third threshold. Otherwise, when the difference between the average strength of the first and third pulses 711, 713 and the average strength of the fourth and fifth pulses 714, 715 is equal or greater than the third threshold, the fourth and fifth pulses 714, 715 can be selected because the fourth and fifth pulses 714, 715 have a greater average strength than that of the first and third pulses 711, 713.

Although shown and described as being fixed record length for purposes of illustration only, ultrasonic wave diagrams of flexible length can be used for selecting a matching pattern of pulses in the disclosed method 100.

Figure 10:
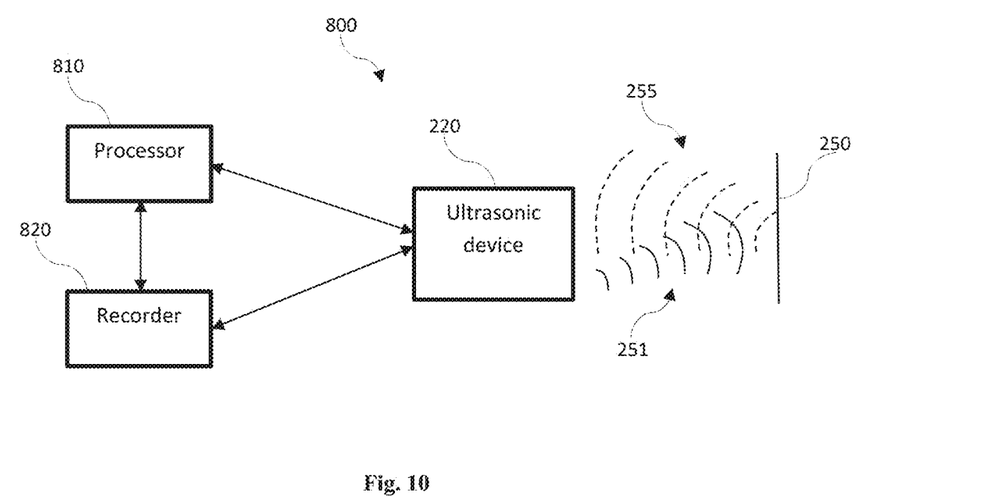
FIG. 10 is an exemplary top-level diagram, illustrating an exemplary embodiment of an ultrasonic detection apparatus 800 using the ultrasonic device of FIG. 4, wherein the ultrasonic detection apparatus comprises a processor and/or a recorder.

FIG. 10 is an alternative embodiment of the ultrasonic device 220 of FIG. 4. In FIG. 10, an ultrasonic detection apparatus 800 is provided as having an ultrasonic device 220, a processor 810 and a recorder 820. The ultrasonic device 220 can be provided in the same manner shown and described above with reference to FIG. 4. In FIG. 10, similar to FIG. 4, the ultrasonic device 220 can emit encoded ultrasonic waves 251 in respective directions for detecting objects in each direction. When encounter an object 250, the encoded ultrasonic waves 251 can be reflected. The reflected ultrasonic waves 255 can reach the ultrasonic device 220 and received by a receiving sensor 212 associated with the ultrasonic device 220, such as the first receiving sensor 212A (shown in FIG. 4).

In some embodiments of the ultrasonic detection apparatus 800, a processor 810 can be provided for processing the reflected ultrasonic waves 255. The processor 810 can decode the received ultrasonic wave pulses by selecting a pattern of pulses matching with the interval of the ultrasonic waves 251 in the manner shown and described with reference to FIG. 7. The processor 810 can then calculate a time lapse between corresponding emitted pulses and received pulses, and calculate a distance between the ultrasonic device 220 and the object 250 based on the time lapse. The processor 810 can comprise any commercially available processing chip. The processor 810 can also be custom-designed processing chips specially produced for the ultrasonic detection apparatus 800.

Additionally and/or alternatively, the processor 810 can include one or more general purpose microprocessors (for example, single or multi-core processors), application-specific integrated circuits, application-specific instruction-set processors, data processing units, physics processing units, digital signal processing units, coprocessors, network processing units, audio processing units, encryption processing units, and the like. The processor 810 can be configured to perform any of the methods described herein, including but not limited to, a variety of operations relating to obstacle detection. In some embodiments, the processor 810 can include specialized hardware for processing specific operations relating to obstacle detection.

The processor 810 can usually be associated with the ultrasonic device 220 via a hardware or wireless connection. The processor 810 can be an integrated part of the ultrasonic device 220 and/or arranged locally on a platform (not shown) that the ultrasonic device 220 is provided when the connection is via the hardware or wireless connection. The processor 810 can also be a separated part of the ultrasonic device 220 and/or be arranged remotely via the wireless connection. In such cases, the processor 810 can be arranged in a control center, a docking station and/or other mobile platforms. When the processor 810 is not arranged on the same mobile platform with the ultrasonic device 220, a payload of the mobile platform can be improved because of the arrangement.

In exemplary embodiments, each ultrasonic module 210 can be provided with an individual processor 810. In some embodiments, the processor 810 can be provided as a centralized processor 810 for controlling all ultrasonic modules 210 associated with the ultrasonic device 220, or the processors 810 for each ultrasonic module 210 can at least be partially integrated to form the centralized processor 810.

In some alternative embodiments, an optional recorder 820 can be provided for logging all or part of the relevant information regarding the ultrasonic waves emitted by each emitting sensors 211 and/or received by each receiving sensors 212. The recorder 820 can be any physical type of recorders or recording applications. Any type of commercially available recorders or recording applications can be provided for the ultrasonic device 220. The recorder 820 can be operably connected with the ultrasonic device 220 such that the recorder 820 can exchange data with the ultrasonic device 220, including the information representing the pulses of the reflected ultrasonic waves 255. The data can be used by the processor 810 for selecting reflected ultrasonic waves 255, as shown and described with reference to FIG. 7.

In addition, the recorder 820 can be connected with the processor 810 such that the processor 810 can exchange information between the processor 810 and the recorder 820. The information being exchanged between the recorder 820 and the processor 810 can comprise the recorded information representing the reflected ultrasonic waves 255, which can be used to determining a distance of the object 250 being detected.

The connection between the recorder 820 and the ultrasonic device 220 and the connection between the recorder 820 and the processor 810 can be either physical connections or wireless connections. The recorder 820 can be integrated or arranged locally on a same platform with the ultrasonic device 220 and/or the processor 810. When arranged remotely, the recorder 820 can be connected with the processor 810 and/or the ultrasonic device 220 via wireless connections.

Figure 11:
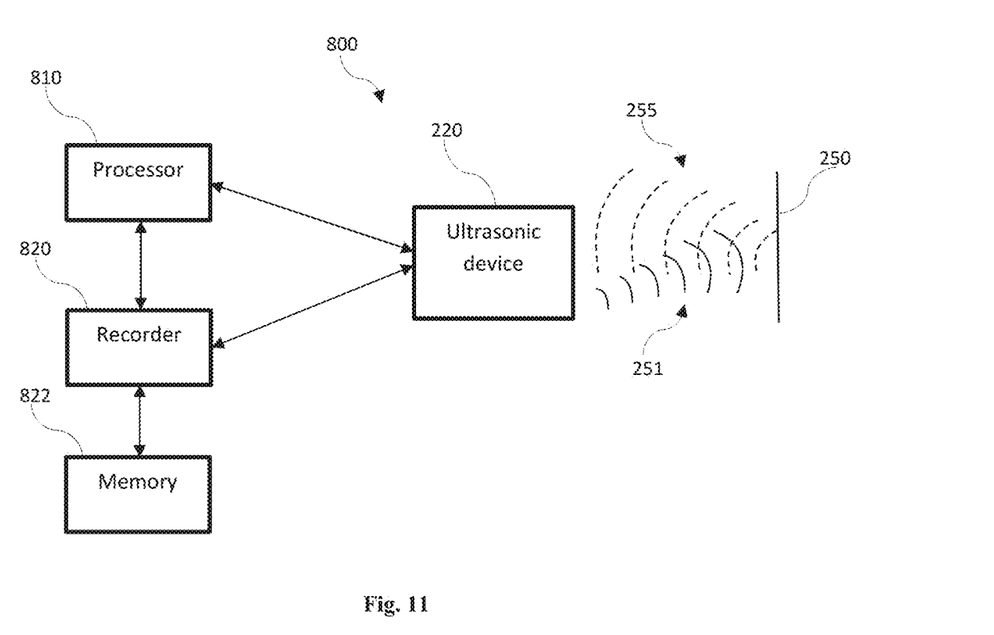
FIG. 11 is an exemplary top-level diagram, illustrating an alternative embodiment of the ultrasonic detection apparatus of FIG. 10, wherein the ultrasonic detection apparatus comprises a memory.

Turning now to FIG. 11, in an alternative embodiment, the ultrasonic detection apparatus 800 of FIG. 10 can also comprise an optional memory 822 for storing the information recorded by the recorder 820. The memory 822 can be operably connected with the recorder 820. The memory 822 can be connected to and communicate with any components of the ultrasonic detection apparatus 800 either directly or via any other components. The memory 822 can be integrated or arranged locally on a same platform with the ultrasonic device 220, the processor 810 and/or the recorder 820. When arranged remotely, the recorder 820 can be connected with the recorder 820 and/or the processor 810 via wireless connections.

The memory 822 can comprise any form of commercially available memory, including but not limited to, a random access memory ("RAM"), static RAM, dynamic RAM, read-only memory ("ROM"), programmable ROM, erasable programmable ROM, electrically erasable programmable ROM, flash memory, secure digital ("SD") card, and the like.

Figure 12:
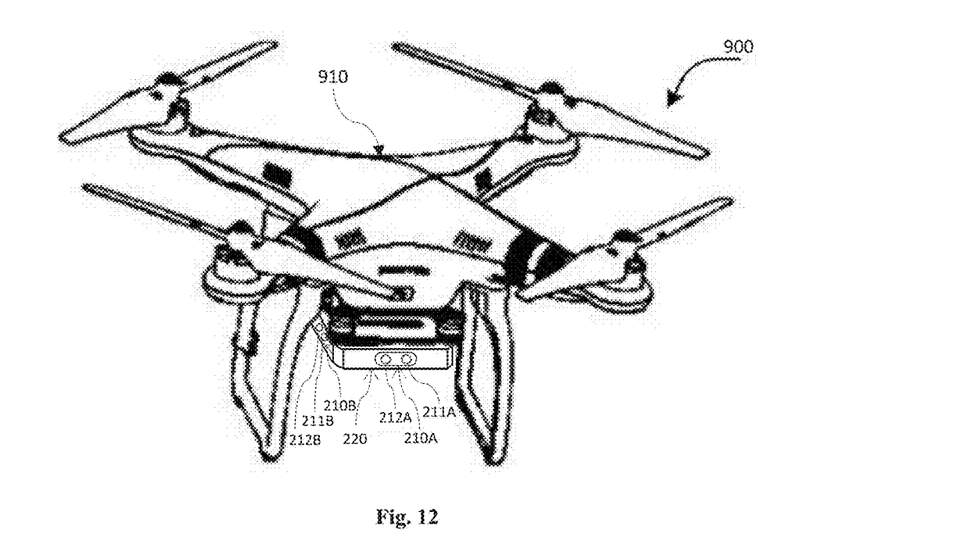
FIG. 12 is an exemplary schematic diagram, illustrating an alternative embodiment of the ultrasonic device of FIG. 4, wherein the ultrasonic device is installed aboard an Unmanned Aerial Vehicle ("UAV").

FIG. 12 shows an embodiment of a mobile system 1000 installed with the ultrasonic device 220 (shown in FIG. 4). The mobile platform 1000 is shown as an Unmanned Aerial Vehicle ("UAV") 900 comprising motors and propellers. UAV 900 are aircrafts without a human pilot onboard the vehicle whose flight can be controlled autonomously or by a remote pilot (or sometimes both). UAV 900 are now finding increasing usages in civilian applications involving various aerial operations, such as data-gathering and/or data-delivery. The present systems and methods disclosed herein can be suitable for many types of UAV 900 including, without limitation, quadcopters (also referred as a quadrotor helicopter or quad rotors), single rotor, dual rotor, trirotor, hexarotor, and octorotor rotorcraft UAVs, fixed wing UAVs, and hybrid rotorcraft-fixed wing UAVs.

In FIG. 12, the ultrasonic device 220 is shown as having a first ultrasonic module 210A arranged on one side of the ultrasonic device 220 with a first emitting sensor 211A and a first receiving sensor 212A. A second ultrasonic module 210B is arranged on another side of the ultrasonic device 220 with a second emitting sensor 211B and a second receiving sensor 212B. Two more ultrasonic modules 210 (not shown) can be provided at each of the sides of the ultrasonic device 220. In FIG. 12, each of the ultrasonic devices 210 can detect objects in one side of the UAV 900.

In some embodiments, the ultrasonic device 220 can be hung under the body 910 of the UAV 900, as shown in FIG. 12. The ultrasonic device 220 can also be arranged on the top of the UAV 900, on one side of the UAV 900, or physically integrated with the UAV 900. Each of the components, including the processor 810, the recorder 820 and/or the memory 822, can be physically integrated with the ultrasonic device 220, or be arranged inside the body 910 of the UAV 900. Regardless of a position, the processor 810, the recorder 820 and/or the memory 822 can be operably connected to the UAV 900.

Figure 13:
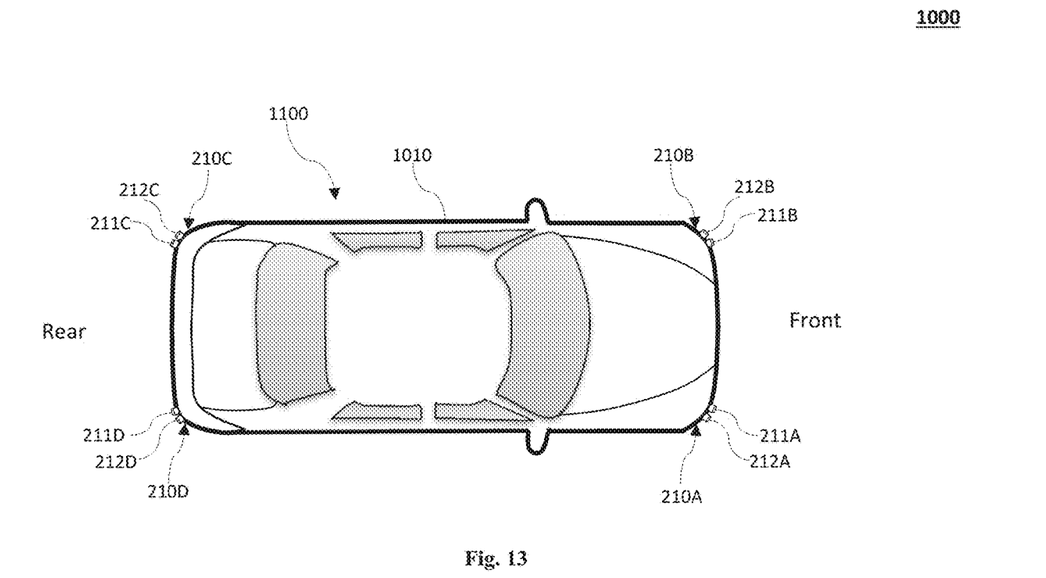
FIG. 13 is an exemplary schematic diagram, illustrating another alternative embodiment of the ultrasonic device of FIG. 4, wherein the ultrasonic device is installed aboard an automobile.

FIG. 13 shows another alternative embodiment of the ultrasonic device 220 (shown in FIG. 4), where the ultrasonic device 220 is installed aboard a mobile platform 1000. The mobile platform 1000 is shown as an automobile 1100, comprising a body 1010 and wheels (not shown). In this embodiment, the ultrasonic device 220 can be arranged at any position on the body 1010 of the automobile 1100. The processor 810, the recorder 820 and the memory 822 can be integrated with the ultrasonic device 220, and/or the automobile 1100.

As described with reference to FIG. 4, the ultrasonic device 220 shown in FIG. 13 can be arranged in a separated configuration with each of the ultrasonic modules 210A, 210B, 210C, 210D being arranged at each corner of the automobile 1100. In FIG. 13, the first ultrasonic emitting sensor 211A and the first ultrasonic receiving sensor 212A can be arranged at a diver corner; the second ultrasonic emitting sensor 211B and the second ultrasonic receiving sensor 212B can be arranged at a passenger corner. In addition, the third ultrasonic emitting sensor 211C and the third ultrasonic receiving sensor 212C can be arranged at one rear corner; and the fourth ultrasonic emitting sensor 211D and the fourth ultrasonic receiving sensor 212D can be arranged at another rear corner.

Although shown and described as being a UAV 900 or an automobile 1100 for purposes of illustration only, the mobile platform 1000 can be any suitable mobile platform, including but not limited to, an aircraft, a helicopter, a boat, a ship, various hybrids thereof, and the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for detecting an object, comprising:
   emitting a plurality of ultrasonic waves, each being encoded with a unique pattern of ultrasonic pulses and emitted in a predetermined direction, for reflection as a plurality of reflected ultrasonic waves;
   receiving the plurality of reflected ultrasonic waves, each of the plurality of reflected ultrasonic waves including ultrasonic pulses; and
   searching for one of the encoded unique patterns of ultrasonic pulses from the plurality of reflected ultrasonic waves, based on intervals and strengths of the ultrasonic pulses in each of the plurality of reflected ultrasonic waves, and a number of patterns of the ultrasonic pulses that match the encoded unique pattern in each of the plurality of reflected ultrasonic waves, to decode the reflected ultrasonic waves to determine an existence or a location of the object, one interval of the intervals of the ultrasonic pulses including a time between two adjacent ones of the ultrasonic pulses in one of the plurality of reflected ultrasonic waves.

2. The method of claim 1, wherein the emitting the unique pattern comprises emitting the ultrasonic pulses in a unique interval between two adjacent pulses of the ultrasonic pulses.

3. The method of claim 1, wherein searching for the encoded unique pattern from the plurality of reflected ultrasonic waves comprises searching the plurality of reflected ultrasonic waves for the ultrasonic pulses that match a unique interval of the emitted uniquely encoded ultrasonic pulses.

4. The method of claim 3, wherein the searching the plurality of reflected ultrasonic waves for the ultrasonic pulses comprises selecting, from the plurality of reflected ultrasonic waves, a pattern of the ultrasonic pulses matching the unique interval when there is only one pattern of the ultrasonic pulses matching the unique interval in the reflected ultrasonic waves and a strength difference between the ultrasonic pulses in the one pattern is less than a first threshold.

5. The method of claim 4, wherein the selecting the pattern of the ultrasonic pulses comprises determining that the pattern matches the unique interval when a difference between an interval of the pattern and the unique interval is less than a time threshold.

6. The method of claim 3, wherein the searching the plurality of reflected ultrasonic waves for the ultrasonic pulses comprises selecting, from the plurality of reflected ultrasonic waves, the ultrasonic pulses with a strength difference less than a second threshold.

7. The method of claim 3, wherein the searching the plurality of reflected ultrasonic waves for the ultrasonic pulses comprises selecting a pattern of the ultrasonic pulses from two or more patterns of the ultrasonic pulses in the plurality of reflected ultrasonic waves when the two or more patterns of the ultrasonic pulses match the unique interval and a difference of average pulse strengths of the two or more patterns is less than a third threshold.

8. The method of claim 3, wherein the searching the plurality of reflected ultrasonic waves for the ultrasonic pulses comprises selecting a strongest pattern of the ultrasonic pulses from recorded ultrasonic waves of the plurality of reflected ultrasonic waves when two or more patterns of the ultrasonic pulses match the unique interval and a difference of average pulse strengths of the two or more patterns is greater than a fourth threshold, the strongest pattern of the ultrasonic pulses being a pattern of the ultrasonic pulses with a greatest average strength.

9. The method of claim 8, further comprising determining the difference of the average pulse strengths by calculating a difference value over a plurality of average pattern strengths,
   wherein each of the plurality of average pattern strengths is provided by averaging strengths of the ultrasonic pulses in each of the two or more patterns.

10. An ultrasonic device for detecting an object, comprising:
    an emitting sensor configured to emit a plurality of ultrasonic waves, each being encoded with a unique pattern of ultrasonic pulses and emitted in a predetermined direction, for reflection as a plurality of reflected ultrasonic waves;
    a receiving sensor configured to receive the plurality of reflected ultrasonic waves, each of the plurality of reflected ultrasonic waves including ultrasonic pulses; and
    a processor configured to search for one of the encoded unique patterns of ultrasonic pulses from the plurality of reflected ultrasonic waves, based on intervals and strengths of the ultrasonic pulses in each of the plurality of reflected ultrasonic waves, and a number of patterns of the ultrasonic pulses that match the encoded unique pattern in each of the plurality of reflected ultrasonic waves, to decode the reflected ultrasonic waves to determine an existence or a location of the object, one interval of the intervals of the ultrasonic pulses including a time between two adjacent ones of the ultrasonic pulses in one of the plurality of reflected ultrasonic waves.

11. The ultrasonic device of claim 10, wherein the emitting sensor is further configured to emit the unique pattern of the ultrasonic pulses in a unique interval between two adjacent pulses of the ultrasonic pulses.

12. An object detection system, comprising:
a plurality of emitting sensors configured to emit a plurality of ultrasonic waves, each being encoded with a unique pattern of ultrasonic pulses and emitted in a predetermined direction, for reflection as a plurality of reflected ultrasonic waves;
a plurality of receiving sensors corresponding with the emitting sensors, respectively, and configured to receive the reflected ultrasonic waves, each of the plurality of reflected ultrasonic waves including ultrasonic pulses; and
a processor configured to search for one of the encoded unique patterns of ultrasonic pulses from the plurality of reflected ultrasonic waves, based on intervals and strengths of the ultrasonic pulses in each of the plurality of reflected ultrasonic waves, and a number of patterns of the ultrasonic pulses that match the encoded unique pattern in each of the plurality of reflected ultrasonic waves, to decode the reflected ultrasonic waves to determine an existence or a location of the object, one interval of the intervals of the ultrasonic pulses including a time between two adjacent ones of the ultrasonic pulses in one of the plurality of reflected ultrasonic waves.

13. The system of claim 12, further comprising a recorder for recording the reflected ultrasonic waves.

14. The system of claim 12, wherein the processor is further configured to search the plurality of reflected ultrasonic waves for the ultrasonic pulses that match a unique interval of the uniquely encoded ultrasonic pulses emitted from each of the emitting sensors.

* * * * *